UNITED STATES PATENT OFFICE 2,569,644

ORGANIC FLUORINE COMPOSITIONS AND METHOD OF MAKING

Frederic B. Stilmar, Woodstown, N. J., assignor to the United States of America as represented by the United States Atomic Energy Commission No Drawing. Application October 18, 1944, Serial No. 559,230

2 Claims. (Cl. 260—653)

This invention relates to the manufacture of organic fluorine compositions and is particularly directed to a new and improved method for making highly fluorinated organic compositions and to the compositions so made.

Perfluoro and chloroperfluoro compounds are characterized in general by high resistance to oxidizing agents and relatively low toxicity as compared with chlorinated hydrocarbons of similar physical properties. In the past it has been proposed to prepare such fluorine compositions by direct fluorination of hydrocarbons and by replacement of chlorine by fluorine in highly chlorinated hydrocarbons.

It is an object of the present invention to provide stable liquids and solids, inert to acids, alkalis, and oxidizing and reducing agents, and suitable for a variety of uses where these properties are important. Examples of such uses are solvent-resistant water repellants, softeners and modifiers for fluorocarbon resins or other resins, protective coatings, thermoplastic binders, adhesives, electrical insulating and packing compositions, spark quenchers, lubricants and sealants, indicator gauge fluids, etc.

A further object of the invention is to provide a process for the manufacture of such compositions from relatively low molecular weight organic halogen compounds.

According to the present invention, carbon compounds containing a plurality of chlorine, bromine, or iodine atoms and a plurality of fluorine atoms, and preferably only a very minor proportion of hydrogen atoms are condensed by reaction with a metallic copper condensing agent.

I have found that in this condensation process non-fluorine halogen is removed from the carbon compounds selectively and the free bond thus provided unites with other free bonds to produce organic condensation products having physical properties substantially different from those of the starting material. By proper selection of the starting material, condensation products of almost any desired physical properties may be obtained. In general, products having a low chlorine content and high fluorine content tend to form products of relatively low numbers of carbon atoms per molecule, whereas compounds of high chlorine content and low fluorine content tend to produce products of a higher order of condensation.

The highly condensed products of the invention are characterized by a relatively low halogen content as compared with perhalogenated aliphatic hydrocarbons of corresponding numbers of carbon atoms. This can be explained only on the basis that the products contain a large number of double bonds or that they have a net-like molecular structure formed of a number of carbon rings. Since the degree of unsaturation as indicated by susceptibility to further halogenation is comparatively low, it is considered that the presence of a large number of double bonds is unlikely. For example, although the condensation products may be further fluorinated by means of antimony pentafluoride, silver difluoride, cobalt trifluoride, or manganese trifluoride, after exhaustive fluorination with such energetic reagents the products still contain a relatively low proportion of halogen. Since these reagents are capable of saturating simple ethylenic double bonds, it is apparent that the low halogen content of the products cannot be explained on this basis and that the products formed by such fluorination treatment are either free of double bonds or contain them so located in the molecular structure that they are substantially more resistant to attack than corresponding linkages in the simpler compounds.

By the process of the present invention condensation products may be prepared varying in properties from mobile, volatile liquids through the range of viscous, heavy, difficultly vaporizable liquids to high melting, resinous, thermoplastic solids. The condensations of the present invention may be initially homogeneous or heterogeneous. Thus a single chlorofluoro compound may be employed or a mixture of two or more compounds may be used.

The condensations of the present invention may be carried out at atmospheric pressure or at elevated pressures depending upon the volatility of the compounds treated. Usually it is preferred to conduct the process in liquid phase at temperatures between 150° C. and 600° C. and accordingly superatmospheric pressure is employed to prevent vaporization of low-boiling compounds at these temperatures. Elevated pressures also seem to promote a high degree of condensation. However in some cases the process may be conducted in vapor phase in which case elevated pressures may hinder the removal of the condensation products from the reaction zone. The same range of temperatures is applicable to the vapor phase process. I have found that condensation in most cases proceeds satisfactorily at temperatures between about 200° C. and about 300° C., but for the more refractory initial materials higher temperatures are sometimes desirable to accelerate the condensation. For relatively reactive initial materials it is advantageous to carry out the initial reaction at a somewhat lower temperature and to raise the reaction temperature gradually as condensation proceeds.

The condensing agent may be finely divided metallic copper, which may be mixed with an inert material, for example, diatomaceous earth or sodium chloride. The inert material serves as a diluent and mechanical distender for improving the efficiency of utilization of the copper and helps to maintain the porosity of the condensing agent.

The apparatus may be a suitable vessel composed of, or lined with, nickel or any other non-reactive metal; enameled iron or steel equipment may be used.

The following examples will illustrate the process of the present invention and the nature of the products which may be obtained.

CONDENSATION OF TRICHLOROTRIFLUORETHANE—$CCl_2FCClF_2$

Condensation products have been prepared with a residual chlorine content from about 5% to about 35% and with characteristics from light oils to highly viscous oils. The products can be fluorinated by fluorinating agents such as $SbF_5$ to form highly fluorinated compounds of greater stability and lower chlorine content. Thus a heavy oil containing about 15% chlorine has yielded a highly fluorinated, relatively mobile oil containing 5% to 6% chlorine.

Example 1

96 grams of bronzer's leaf copper, 93 grams of trichlorotrifluorethane and 15 grams of iodine were heated in a nickel bomb at 270° to 275° C. 200 cc. of benzene were added to the product to dissolve organic material and the solution was separated from copper and copper chloride residue by filtration. The solid residue contained 25½% Cl and only 0.3% F. The solution was heated to 125° C. to distill off benzene and there remained 6.5 grams of dark brown oil containing 14.3% Cl and 47% F.

Example 2

96 grams of copper and 93 grams of trichlorotrifluorethane were heated in a nickel bomb at 160° C. for 1 hour, then at 200° C. for 1 hour, and finally at 220° C. for 1 hour. 178 grams of product were obtained. The product was slurried with di-ethyl ether and separated by filtration. The gray copper chloride filter residue contained 29.9% Cl and 0.04% F. After evaporation of the ether from the filtrate, the filtrate was distilled yielding 3 grams of distillate at 60° to 90° C., containing 10.6% Cl, and 4 grams of a second distillate fraction at 160° to 200° C., containing 14.2% Cl. The distillation residue amounted to 28 grams of a thick oil containing 14.4% Cl and 47% F. The molecular weight of this product, as determined by the depression of the freezing point of ethylene dichloride, in which it was not completely soluble, was about 1800.

CONDENSATION OF s-TETRACHLORODIFLUORETHANE

Example 3

92 grams of copper, 67 grams of crude s-tetrachlorodifluorethane and 20 cc. of benzene were heated at a temperature between 180° C. and 220° C. for 6 hours in a nickel bomb. The organic product was extracted from inorganic copper salts by trichlorotrifluorethane. The solution was filtered, heated to 200° C. at atmospheric pressure to distill off trichlorotrifluorethane and unreacted tetrachlorodifluorethane. The distillation residue amounted to 10 grams of a resinous product containing 18.5% Cl and 35% F.

CONDENSATION OF s-DICHLOROTETRAFLUORETHANE

This compound is considerably more resistant to condensation than trichlorotrifluorethane and tetrachlorodifluorethane; hence higher temperatures are employed. By heating at temperatures of about 300° C., small quantities of product oils and thermoplastic resins have been obtained.

Example 4

102 grams of 1,2-dichloro-perfluorethane (0.6 mol) and 77 grams of copper (1.2 mols) were heated at 275° C. for 1 hour and at 325° C. for 1 hour. After evaporation of low-boiling compounds from the product, a dry solid remained. This was extracted with trichlorotrifluorethane leaving 115 grams of inorganic salt. The extract was distilled up to 190° C. yielding 1 gram of distillate at 180–190° C. The distillation residue (4 grams) was a thermoplastic solid containing 4.2% Cl.

CONDENSATION OF s-DIBROMOTETRAFLUORETHANE

This compound has yielded, as products of condensation, oils, waxy solids and pulverulent powders with final bromine contents from a little over 5% up to about 35%.

Example 5

78 grams of symmetrical dibromotetrafluorethane, 30.5 grams of copper and 2 grams of iodine were heated to 200–205° C. for 10 hours in a nickel bomb. The product was extracted with 200 cc. of chloroform in a Soxhlet apparatus for 8 hours. The chloroform was removed from the extract by evaporation. The product remaining (4 grams) was a waxy solid at room temperature containing 20% Br.

Example 6

78 grams of s-dibromotetrafluorethane, 38.5 grams of copper and 2 grams of iodine were heated for 5 hours at 175–180° C. in a nickel bomb. 96 grams of a light-colored solid product were obtained. The product, upon fractional distillation, yielded 3 grams of a liquid boiling from 50° to 85° C. and containing 35% Br.

CONDENSATION OF 3-DIFLUOROPERCHLOROPROPENE

The products prepared by condensation of this compound have been somewhat higher in chlorine content than those previously described, containing from around 35% up to more than 50% Cl.

Example 7

77 grams of crude 3-difluoroperchloropropene (boiling range 125° to 129° C.) and 23 grams of copper were heated at 270–275° C. for 10 hours, and the solid product was extracted with 300 cc. of petroleum ether and then with 200 cc. of hot benzene. The remaining solid, amounting to 50 grams, contained 39.3% Cl and no fluorine. The petroleum ether and benzene washes were distilled and a product distilling at 60–80° C. at 1.5 mm of mercury absolute pressure was obtained. This product contained 52.5% Cl and 19-22% F. Its molecular weight as determined by the benzene freezing point method was 320. The crystalline distillation residue amounting to 12 grams contained 37.3% Cl and 21% F.

Example 8

167 grams of 3-difluoroperchloropropene and 60 grams of copper were refluxed overnight without agitation. Almost all of the copper reacted. The product was filtered and the filter residue was washed with petroleum ether. The residue comprised 88 grams of gray copper salt containing 31% Cl and 0.1% F. The filtrate upon distillation gave the following fractions: At 90–170° C., 15 grams; at 170–205° C., 5 grams; at 205° C. at 760 mm to 100° C. at 3 mm, 29 grams; at 110–140° C. at 3 mm. 12 grams containing 47% Cl and 22% F. The distillation residue amounted to 5 grams.

CONDENSATION OF CHLOROFLUORO-PENTENES

These materials, which were prepared by partial fluorination of 4-monohydro-perchloropentene (produced by the Prins method) by hydrogen fluoride in the presence of pentavalent antimony salts at about 180° C., and contained 30% to 40% of chlorine, yielded high-boiling oil products containing from about 15% to about 25% of chlorine and having average molecular weights between 600 and 800.

Example 9

85 grams of a chlorofluoropentene fraction of 150–180° C. boiling range (38% Cl) obtained by reacting $CCl_3.CHCl.CCl_2.CCl:CCl_2$ with HF in the presence of $SbCl_5$, and 49 grams of copper were heated in a nickel bomb for 10 hours at 243–245° C.

The liquid product was separated from 86 grams of solid residue and then distilled to 180° C. at atmospheric pressure. In this way 8 grams of distillate were obtained at 110–180° C.

33 grams of oil remained as distillation residue. The average molecular weight of this oil was determined by the benzene freezing point method and found to be 665. It contained 25.3% Cl and 35% F.

Example 10

80 grams of a chlorofluoropentene fraction of 90–120° C. boiling range (32% Cl), obtained from 4-hydro-perchloropentene as in Example 9, and 90 grams of copper were heated progressively for 1 hour each at 275°, 300°, 325° and 350° C. After separation of solids and distillation of the liquid product to a bath temperature of 300° C., 15 grams of a pitch residue remained. This product retained its pitch consistency at temperatures as high as 100° C.

CONDENSATION OF CHLOROFLUORO-CYCLOHEXANES

Example 11

40 grams of a liquid fluorinated product boiling from 120° C. to 200° C. and containing 30% Cl and obtained by reaction of $SbF_5$ and crude hexachlorobenzene were heated with 25 grams of copper at 250° C. for 10 hours. The product was diluted with 100 cc. of petroleum ether and filtered off from solid copper salt. The solid was washed with petroleum ether and the washes were added to the filtrate. The resulting 33 grams of residue contained 21.6% Cl and 3.3% F. The filtrates were topped to 110° to remove petroleum ether and then distilled. The following distillate fractions were obtained: At 110–140° C., 11 grams; at 140–175° C., 3 grams; at 40–80°/2 mm. absolute pressure, 2 grams; at 80–150°/1 mm. absolute pressure, 5 grams containing 7.4% Cl and having a molecular weight of 563. A brittle residue remained containing 6.2% Cl and 45–49% F.

CONDENSATION OF FLUORINATED CHLORO-HEPTENES

These materials, containing principally fluorochloro-ethylcyclopentanes with between 25% and 50% of organic chlorine and one or two hydrogen atoms per molecule and prepared by partial fluorination of mixtures obtained by the Prins reaction from trichlorethene and carbon tetrachloride, yielded heavy oils and resinous products containing from about 8% to about 25% chlorine and having molecular weights from about 500 to 1100.

Example 12

150 grams of a chlorofluoroheptene fraction, (40% Cl) boiling above 200° C. and obtained by fractionally distilling the product of reaction of HF in the presence of $SbCl_5$ on 2,4-dihydro-3-trichlorethenyl-perchloropentane, and 112 grams of copper were heated in a nickel bomb at 270–275° C. for 10 hours.

The product was extracted with 100 cc. of petroleum ether followed by 200 cc. of hot benzene. A pitchy material, soluble in acetone was deposited on cooling the benzene. 162 grams of gray-white copper salt residue containing 25.3% Cl and 4% F remained from the extraction. The extracts were topped to 80° C. to remove solvent, then fractionally distilled giving at 80–100° C. and 3 mm. pressure 18 grams of distillate containing 29.6% Cl and 35–37% F. The dark brown thermoplastic residue (50 grams) was not volatile up to a 200° C. bath temperature. It contained 18.8% Cl and 38% F and was sufficiently brittle to be ground to a powder at room temperature.

Example 13

150 grams of a chlorofluoroheptene fraction boiling above 200° C. containing 40% Cl and having a molecular weight of 378 (by benzene freezing point method) and 112 grams of copper were heated for 10 hours at 235–240° C. in a nickel bomb. The product was washed with petroleum ether, leaving 154 grams of light gray copper salts containing 21.6% Cl and no F.

The extract was distilled yielding 25 grams of a mobile yellow distillate oil below 90° C. at 4 mm. absolute pressure containing 32% F and having a molecular weight of about 365 and 73 grams of distillation residue solidifying to a dark resin, containing 27.1% Cl and 36% F and having a molecular weight of about 860.

Example 14

600 grams of $SbF_5$ were added to 200 grams of 2,4-dihydro-3-trichlorethenyl-perchloropentane in about 2 hours. The mixture was heated slowly to 100° C. then held 20 minutes. There was slight gas evolution. The mixture was cooled and poured on ice; the precipitated organic matter was washed with HCl and then with water until acid-free. 132 grams of brown viscous liquid product were obtained with a refractive index of 1.446 and containing 37% Cl and 32% F. This corresponds to an average composition $C_7H_{2.7}Cl_{2.8}F_{4.5}$.

75 grams of this product were refluxed with 20 grams of copper at 205° C. for 10 hours. The product was cooled and diluted with petroleum ether (30° to 60° boiling range). The mixture was then filtered and the filter-cake was washed with petroleum ether until colorless. The filter-cake consisted of 30 grams of a light gray-white copper salt containing 28% Cl and 2% F. The filtrate was fractionally distilled. A fraction distilling at 140°–230° C. at 45 mm. of mercury absolute pressure (most over between 140° and 200°) amounted to 40 grams and contained 31.6% Cl and 33–36% F. A second fraction distilling at 200–280° C. at fairly high-vacuum amounted to 15 grams and contained 24.6% Cl and 42% F. This product was a red oil having a molecular weight of about 923.

*Example 15*

150 grams of 140–200° fluorinated chloroheptene fraction, containing about 30% Cl and between 35% and 40% F, and 112 grams of copper were heated in a nickel bomb at 205–210° C. for 12 hours. The contents of the bomb were nearly dry at the end of this period. This material was diluted with petroleum ether and the solid was further washed with petroleum ether until almost colorless. 130 grams of copper salts containing 15.5% Cl were obtained. The petroleum ether solute, after distilling off the ether, was further distilled and yielded 22 grams of product distilling at 140–165° C. and containing 20.8% Cl and 45% F, 63 grams of product distilling at 90–150° C. at 0.8 mm. absolute pressure and containing 19.4% Cl and 43–47% F, and 24 grams of thermoplastic distillation residue, solid at room temperature, containing 13.9% Cl and 43–46% F.

*Example 16*

150 grams of the fluorinated chloroheptene fraction used in Example 15 and 112 grams of copper were heated in a nickel bomb at 270–275° C. for 10 hours. The product was a pasty mass. The mass was extracted with 100 cc. of acetone, and residual solid was washed with an additional 200 cc. of acetone. The solid was still colored and accordingly was washed with an additional 100 cc. of hot acetone. The solid amounted to 153 grams and contained 21.6% Cl and 3–5% F. The combined acetone solutions were topped to remove the acetone and then further distilled. 20 grams of distillate were obtained at 90–160° C. at 1.5 mm. containing 13.2% Cl and 44% F. The molecular weight was determined by depression of the freezing point of benzene and in two determinations was found to be 596 and 611. The distillation residue, amounting to 37 grams, was a carbonaceous material containing 8% Cl and 44–46% F.

*Example 17*

150 grams of the 140–200° C. fluorinated chloroheptene fraction used in Example 15, and 73.6 grams of copper were heated at 235–240° C. for 10 hours. The product was mixed with 100 cc. of petroleum ether and the solid was filtered from the resulting solution and reslurried with an additional 100 cc. of petroleum ether, filtered, and washed with additional petroleum ether until clean. 101 grams of solids were obtained containing 23.1% Cl and 0.08% F. The combined filtrates were topped to remove solvent and distilled. Three distillate fractions were obtained as follows: 23 grams at 135–180° C. containing 20.2% Cl and having a molecular weight of about 330, 32 grams at 70–85° C. at 1.5 mm. containing 19.4% Cl and having a molecular weight of about 460, and 18 grams of an oil distilling at 85–115° C. at 1.5 mm. containing 16.5% Cl and having a molecular weight of about 570. 36 grams of an oily residue remained containing 14.2% Cl and 45% F. The molecular weight was determined in acetic acid and values of 350 and 403 were obtained. The material was not soluble in benzene.

CONDENSATION OF $CCl_3(-CFCl-CF_2-)_xCl$

This initial material, which is a mixture prepared by condensing chlorotrifluorethene and carbon tetrachloride and distilling the product to separate unreacted material, yielded products containing from about 6% to about 14% of chlorine and varying in properties from liquids to brittle thermoplastic resins.

*Example 18*

44 grams of a composition melting at about 160–170° C. and containing 31% of chlorine and obtained by heating 60 grams of chlorotrifluorethene with 120 grams of carbon tetrachloride and 3 grams of benzoyl peroxide at 100° C. for 8 hours were heated with 30 grams of copper for one hour at 275° C. and for one hour at 335° C. in a nickel bomb. The product was extracted with trichlorotrifluorethane. The extract was distilled giving 5 grams of distillate at 130–200° C. containing 10.2% Cl and 17 grams of distillation residue containing 6.9% Cl. The residue was a thermoplastic pitch-like solid which liquefied at a temperature below 200° C.

CO-CONDENSATION OF DI AND TRI-FLUORO-PERCHLORETHANE MIXTURES

These materials have yielded products varying from semi-solid thermoplastic masses to brittle resins with chlorine contents between 14% and 20%.

*Example 19*

44.8 grams of s-tetrachloro-difluorethane and 67.2 grams of trichlorotrifluorethane were mixed with 154 grams of finely divided copper and 20 cc. of benzene. The mixture was heated as follows:

1½ hours at 140° C.
1½ hours at 160° C.
1½ hours at 180° C.
1½ hours at 200° C.
1½ hours at 220° C.
1½ hours at 250° C.

The product was separated from inorganic residue and distilled. About 5 grams of material distilling in the temperature range 130° to 220° C. were obtained leaving 23 grams of semi-solid organic residue containing 16.5% Cl.

CO - CONDENSATION OF FLUORINATED NONACHLOROPENTENE AND FLUORINATED DODECACHLOROHEPTENE

*Example 20*

The fluorinated nonachloropentene contained about 35% Cl and about 25% F and contained one hydrogen atom in the molecule. It had a boiling range of 150° to 180° C. at atmospheric pressure. It was obtained by heating nonachloropentene with HF and $SbCl_5$ at 150° C. at elevated pressure.

The fluorinated dodecachloroheptene contained about 30% Cl and between 35% and 40% F and contained one hydrogen atom in the molecule. It had a boiling range of 160° to 200° C. at atmospheric pressure. It was obtained by heating dodecachloroheptene with HF and SbCl₅ at 150° C. at elevated pressures.

113 grams of the fluorinated nonachloropentene, 113 grams of the fluorinated dodecachloroheptene, and 130 grams of copper (bronzer's leaf) were heated at 243–245° C. for 10 hours in a nickel bomb.

The product was recovered as described in Example 15. It consisted of 42 grams of an oil-resin mixture. The oil (10 grams) was distilled off leaving 32 grams of resinous distillation residue distilling above 175° C.

STABILIZATION TREATMENTS

The following examples illustrate the method of improving the stability of the products of the condensation process by subsequent fluorination.

Example 21

210 grams of an oily condensation product boiling above 250° C. and obtained by the method described in Example 2 and 1050 grams of antimony pentafluoride were heated for three hours at 180° C. in a nickel bomb. The reaction product was then extracted with trichlorotrifluorethane and the extract was washed with water until free of acid. The trichlorotrifluorethane was then distilled off and the product was distilled in vacuum. The following fractions were obtained:

(a) 65.5 grams boiling below 145° C. at 10 mm.
(b) 44 grams boiling below 179° C. at 0.8 mm.
(c) 57.5 grams of solid distillation residue.

Fraction (b) was a brown-colored mobile liquid having a refractive index (sodium-D-line) of 1.3625.

Example 22

245 grams of a thermoplastic condensation product obtained as described in Example 13 and 750 grams of antimony pentafluoride were heated at 180° C. for three hours in an aluminum-lined bomb at autogenous pressure. The product was poured into a mixture of ice and hydrochloric acid. The organic layer was separated from the aqueous solution, washed acid-free with water, dried with calcium chloride, and distilled. The following fractions were obtained:

(a) 50 grams boiling below 120° C. and having a refractive index of 1.323,
(b) 109 grams boiling below 180° C. at 0.6 mm. absolute pressure,
(c) 50 grams of distillation residue.

Example 23

160 grams of a fluorinated oil fraction obtained as in the preceding example and boiling between 120° C. at atmospheric pressure and 180° C. at 0.6 mm. of mercury absolute pressure were mixed with 600 grams of antimony pentafluoride and the mixture was heated for three hours at 180° C. in an aluminum-lined bomb. The product was poured into a mixture of ice and hydrochloric acid solution. The organic product was separated from the aqueous solution, washed acid-free with water, dried, and distilled. 90.5 grams of distillate were obtained having a boiling range of 30° to 150° C. (at 0.6 mm. of mercury absolute pressure), a refractive index of 1.365, a density of 1.879 and a chlorine content of 4.3%. The residue was a non-volatile grease.

43 grams of the distillate boiling at 70–140° C. at 10 mm. absolute pressure were mixed with 55 grams of cobalt trifluoride and the mixture was heated at 200° C. for one hour. The product was extracted with carbon tetrachloride. The tetrachloride was distilled off and the product was distilled giving 31.5 grams of a stable oil boiling between 70° and 140° C. (at 10 mm. absolute pressure), having a refractive index of 1.340, a density of 1.887, and a chlorine content of 3.1%.

Example 24

80 parts by weight of the resinous product of Example 20 were heated with 200 parts by weight of SbF₅ at 180° C. for 6 hours in an autoclave. The product was separated as described in Example 22. Upon distillation it yielded a fluorinated oil fraction boiling up to 140° C. at 10 mm. of mercury absolute pressure and containing between 5% and 6% of organic chlorine, and a solid residue non-volatile at temperatures as high as 200° C. at 10 mm. pressure. The stability of the products is still further improved by treatment with AgF₂, CoF₃ or MnF₃ as described in Example 23.

It will be understood that I intend to include variations and modifications of the invention and that the preceding examples are illustrations only and in no wise to be construed as limitations upon the invention, the scope of which is defined in the appended claims, wherein

I claim:

1. The method of preparing highly fluorinated organic condensation products from a chlorofluoro organic compound which comprises heating a chlorofluoro organic compound which is selected from the aliphatic and alicyclic series and which consists of from two to seven carbon atoms, a plurality of fluorine atoms, a plurality of chlorine atoms and not more than two hydrogen atoms per molecule in liquid phase contact with a metallic copper condensing agent at a temperature between 140° C. and 350° C., diluting the reaction mixture with an organic solvent, separating the solid used condensing agent from the liquid mixture of condensation products and organic solvent, distilling off the organic solvent, separating the condensation products by fractional distillation, and then further fluorinating said condensation products by reacting them with a fluorinating agent selected from the group consisting of antimony pentafluoride, silver difluoride, cobalt trifluoride and manganese trifluoride so as to replace at least a part of the residual chlorine by fluorine.

2. The method of preparing a stable, highly fluorinated high-boiling oil which comprises condensing trichlorotrifluorethane by heating it in liquid phase contact with a metallic copper condensing agent at a temperature between 160° C. and 275° C., diluting the reaction mixture with an organic solvent, separating the solid used condensing agent from the liquid mixture of condensation products and organic solvent, distilling off the organic solvent, separating the condensation products by fractional distillation, and then further fluorinating at least one of said condensation products by reacting it with a fluorinating agent selected from the group consisting of antimony pentafluoride, silver difluoride, cobalt trifluoride, and manganese trifluoride so as to replace at least a part of the residual chlorine by fluorine.

FREDERIC B. STILMAR.

(References on following page)

REFERENCES CITED

The following references are of record in the file of this patent:

UNITED STATES PATENTS

| Number | Name | Date |
|---|---|---|
| 1,998,309 | Clark et al. | Apr. 16, 1935 |
| 2,122,278 | Clark | June 28, 1938 |
| 2,129,289 | Soll | Sept. 6, 1938 |
| 2,186,916 | Wiezevich | Jan. 9, 1940 |
| 2,230,654 | Plunkett | Feb. 4, 1941 |
| 2,384,821 | Downing et al. | Sept. 18, 1945 |
| 2,387,247 | Downing et al. | Oct. 23, 1945 |

FOREIGN PATENTS

| Number | Country | Date |
|---|---|---|
| 677,071 | Germany | June 17, 1939 |

OTHER REFERENCES

Cohen "Organic Chemistry," Part I, Reactions, pages 215, 231 (4th edition, 1923).